July 2, 1935.  M. GROSSMAN  2,006,890
DEVICE AND PROCESS FOR OBTAINING SOUND FROM A PRINTED
IMPRESSION ON PAPER OF LIGHT FLUCTUATIONS
Filed March 25, 1932
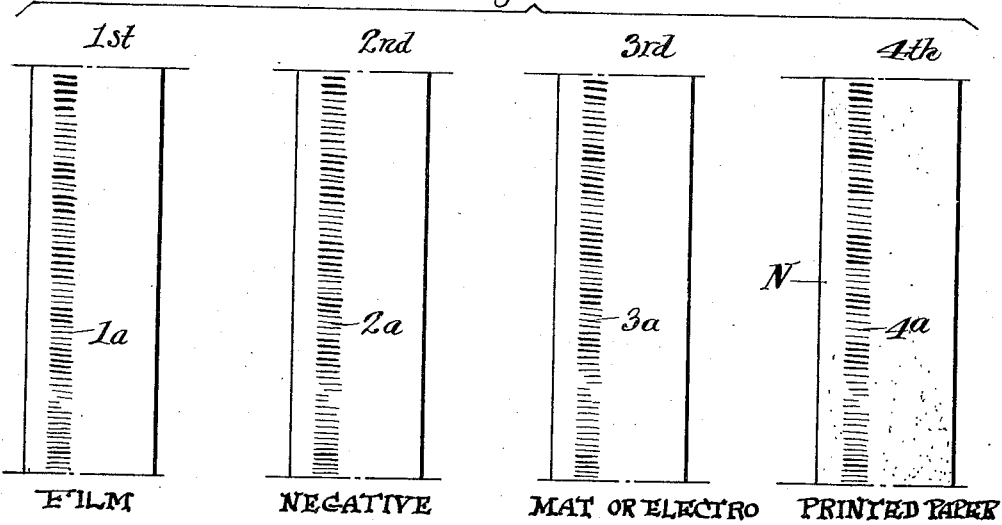
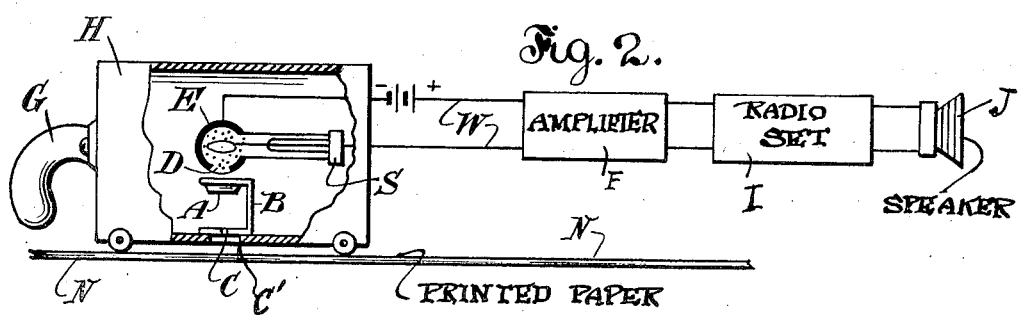
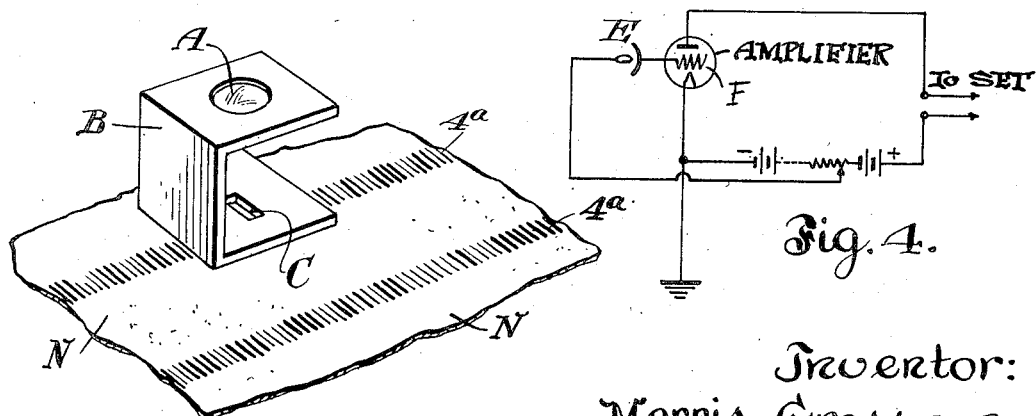
Inventor:
Morris Grossman
by Lester L. Sargent
Atty.

Patented July 2, 1935

2,006,890

UNITED STATES PATENT OFFICE 2,006,890

DEVICE AND PROCESS FOR OBTAINING SOUND FROM A PRINTED IMPRESSION ON PAPER OF LIGHT FLUCTUATIONS

Morris Grossman, New York, N. Y.

Application March 25, 1932, Serial No. 601,271

2 Claims. (Cl. 179—100.3)

The object of my invention is to provide a novel device for obtaining sound from a printed impression on paper of light fluctuations. I attain these and other objects by the mechanism illustrated in the accompanying drawing, in which—

Figure 1 is a plan view of a film printed to control light fluctuations corresponding with audible sounds, the negative of same, the matrix made from such negatives and the printed paper reproduced from the matrix;

Fig. 2 is a view partly in side elevation and partly in section of the invention in use, the electrical mechanism in connection with same being shown in diagram;

Fig. 3 is a detail perspective view of the lens holder; and

Fig. 4 is a diagram of the electric circuit with one stage of amplification, the grid to the filament resistance of the amplifying tube acting as a coupling resistance.

Like characters of reference designate like elements in each of the several views.

Referring to Fig. 1 of the drawing, there is illustrated under designation "1st", a strip of film having a printed impression 1a of light fluctuations corresponding with the sounds to be reproduced by the film. Under the heading "2nd" there is illustrated the negative of such a strip of film having the light fluctuations 2a printed in characters the reverse of those designated as 1a on the film. Under the heading "3rd" there is illustrated the matrix or electro reproduced from the negative 2a. Under the heading "4th" there is illustrated the printed paper N bearing a series of fine lines, the reproduction of light fluctuations 4a reproduced from the matrix or electro are the reverse, as to what lines are light and heavy, of the lines shown on 3a, but correspond with the light fluctuations 1a on the original film. Thus when we view the paper we see a series of fine lines which correspond to the light variations of the original sound as photographed.

The invention consists of a suitable lens A in connection with a photo-electric cell E and an amplifier F. Referring especially to Fig. 2 of the drawing, I provide a suitable bakelite housing H having a suitable handle G to serve as a guide to guide the instrument across the printed page at the proper speed. The housing is provided with a bottom opening C' and over this opening is mounted the U-shaped metallic housing B which carries the lens A and is provided with a small opening C directly under the lens A. Directly over the lens A is mounted the photo-electric cell E which is provided with the window D for admission of light to the photo-electric cell. The photo-electric cell E is mounted in a suitable socket S on the housing H in any suitable manner. The photo-electric cell E is electrically connected by wires W with the amplifier F and thence to radio set I which in turn is provided with a conventional loud speaker J.

In operation the light from the printed page N is admitted through openings C' and C and focused on the lens A, passing through the lens and through the photo-electric cell window D to the photo-electric cell E. The photo-electric cell E converts the light which it receives into electric impulses. In a photo-electric cell the electric emission is proportional to the intensity of light incident upon the cell. The function of the cell is to generate an alternating signal which is amplified to the required degree by a high quality amplifier. When the paper is printed we have a series of fluctuating lines, such as illustrated in Figs. 1 and 3 of the drawing, corresponding in intensity to the original variation of the electric light which was created by the intensity and pitch of the original sound.

In using the device I run the bakelite housing with its photo-electric cell across the printed form or representation of light variations as reproduced on the printed paper. The lens focuses the light variations 4a of the printed page N upon the photo-electric cell E which generates an alternating signal. The cell E is connected to an amplifier F which amplifies the signal to the required strength. The amplifier F is connected with a receiving set I which emits the sound as reproduced from the paper. It can be seen that there are many uses for this invention. Talks, music, and other audible sounds can be printed as part of a newspaper, magazine, or book, and reproduced by the listener at will.

What I claim is:

1. In a device for obtaining sound from a printed impression on paper of light fluctuations, the combination of a non-conducting housing, a handle for said housing, a lens holder mounted in the housing, said lens holder having an aperture extending therethrough and registering with an opening in the housing, a lens positioned over the aforesaid aperture, a photo-electric cell mounted in the housing and having its window over the lens, an amplifier electrically connected with the photo-electric cell, and a radio receiving set electrically connected with the amplifier for audibly reproducing sounds which have been recorded on a printed page and which correspond to the light variations of the original sound as photographed.

2. In a device for obtaining sound from a printed impression on film, paper and the like, of light fluctuations, the combination of a housing having walls adapted to exclude light, a lens holder mounted in the housing, said lens holder having an aperture extending therethrough and registering with an opening in the housing; a lens positioned over the aforesaid aperture, a photo-electric cell mounted in the housing and having its window over the lens, an amplifier electrically connected with the photo-electric cell, and a radio receiving set electrically connected with the amplifier for audibly reproducing sounds which have been recorded on a film or on a printed page or the like and which correspond to the light variations of the original sound as photographed.

MORRIS GROSSMAN.